United States Patent [19]

Husby

[11] Patent Number: 4,887,843
[45] Date of Patent: Dec. 19, 1989

[54] CHARGING SYSTEM FOR A STEERING WHEEL MOUNTED AIR BAG SYSTEM

[75] Inventor: Harald Husby, Budd Lake, N.J.

[73] Assignee: Breed Automotive Technology, Inc., Wilmington, Del.

[21] Appl. No.: 914,656

[22] Filed: Oct. 2, 1986

[51] Int. Cl.[4] .............................................. B60R 21/32
[52] U.S. Cl. .................................... 280/735; 180/282
[58] Field of Search ................ 280/731, 735; 180/282; 307/9, 10 R; 340/52 H

[56] References Cited

U.S. PATENT DOCUMENTS

| | | | |
|---|---|---|---|
| 4,167,276 | 9/1979 | Bell et al. | 280/731 |
| 4,222,030 | 9/1980 | Yasui et al. | 280/735 |
| 4,405,924 | 9/1983 | Shinoda et al. | 307/10 R |
| 4,504,082 | 3/1985 | Brown, Jr. et al. | 280/735 |

Primary Examiner—Kenneth R. Rice
Attorney, Agent, or Firm—Kane, Dalsimer, Sullivan, Kurucz, Levy, Eisele and Richard

[57] ABSTRACT

An air bag control circuit for a motor vehicle includes an energy storage element, a crash sensor and a trigger for inflating the air bag. The energy storage element is coupled for charging to the motor vehicle horn circuit. The control circuit is especially suited for air bags mounted on steering wheels.

8 Claims, 2 Drawing Sheets

CHARGING SYSTEM FOR A STEERING WHEEL MOUNTED AIR BAG SYSTEM

BACKGROUND OF THE INVENTION

1. Field of the Invention

This invention pertains to an air bag system mounted on the steering wheel of a motor vehicle, and more particularly, to a system having energy storage means for inflating the air bag.

2. Background of the Invention

Air bags are the most recent active restraint means used to protect the occupants in a motor vehicle during collisions. These air bags commonly include an inflatable envelope which is normally folded in a compact space, inflating means for rapidly dispensing a gas into the envelope and control means which sense a collision and trigger the inflating means accordingly. It has been found that the operator of the motor vehicle is best protected by attaching an air bag to the steering wheel. However, because the steering wheel must remain freely rotatable for a safe operation of the vehicle, heretofore it was difficult and expensive to provide a safe and reliable power source for the air bag control means. For example, in U.S. Pat. No. 4,504,082, it has been suggested that the air bag control means be directly coupled to the vehicle battery through the horn circuit. However, this coupling requires major changes in the vehicle wiring and relies on the vehicle battery as a primary power source.

OBJECTIVES AND SUMMARY OF THE INVENTION

In view of the above, a principal objective of the present invention is to provide an air bag system mounted on the steering wheel of a vehicle which requires no modifications in the vehicle wiring.

Another objective is to provide an air bag control means which has its own power source whereby, the air bag is operable in dependently of the vehicle battery.

A further objective is to provide a control means having a small number of parts so that it is inexpensive to make and easy to troubleshoot and repair.

Yet another objective is to provide an air bag system including indicating means to show that the system is operational.

According to this invention, an air bag control system comprises an electric energy storage element operatively connected to a crash sensor for triggering the air bag inflating means. The storage element is coupled to the vehicle battery, preferably through the horn circuit for recharging. Since the horn-activating means is usually mounted on the steering wheel without any extra electrical connections are not required.

DETAILED DESCRIPTION OF THE INVENTION

Figure 1:
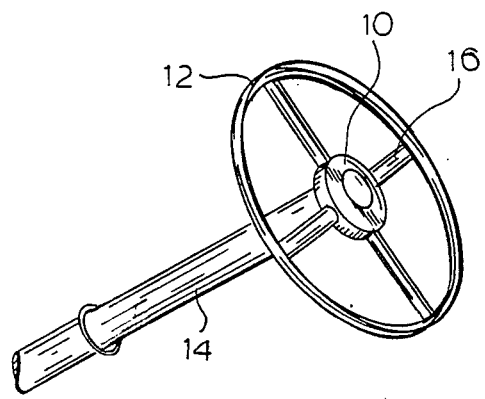
FIG. 1 shows an air bag system constructed in accordance with this invention.

Referring now to the Figures and in particular to FIG. 1, an air bag system 10 according to this invention is preferably is mounted on a steering wheel 12 with a steering wheel shaft 14. The steering wheel also has a horn button 16 connected to the vehicle wiring harness through a slip ring 18.

Figure 2:
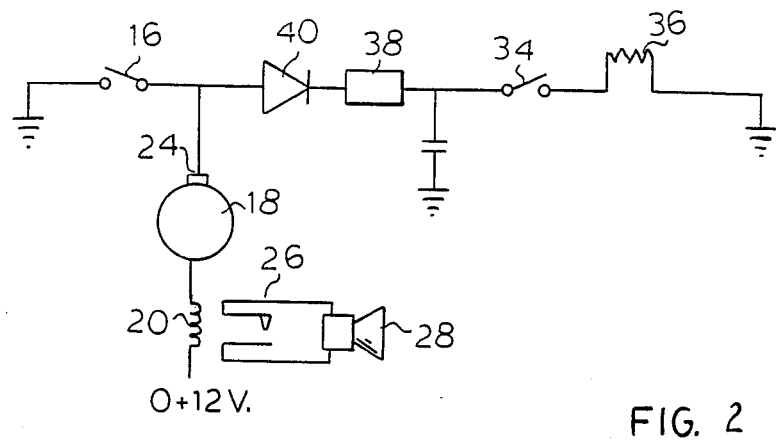
FIG. 2 shows a preferred control circuit of the air bag system of FIG. 1.

Details of the horn circuit and a preferred embodiment of the air bag control circuit are shown in FIG. 2. A horn activating means such as a relay coil 20 has one terminal connected to the positive terminal of the vehicle battery (not shown). The other coil relay terminal is connected through slip ring 18 and intermediate conductor 24 to horn button 16. The slip ring 18 permits steering wheel to rotate freely while maintaining electrical contact between conductor 24 and horn relay coil 20. Horn relay contact 26 is coupled to the relay coil 20 and is used to energize vehicle horn 28. When horn button 16 is activated momentarily, it grounds conductor 24 energizing horn relay coil 20. The energized coil closes relay contact 26 activating horn 28. The circuit described thus far is standard for most motor vehicles.

The air bag control circuit 30 comprises an electric energy storage element 32, a sensor 34, and a gas generator trigger 36. The electric storage element 30 and sensor 34 are connected in series with a dropping resistor 38 and the cathode of a blocking diode 40. The anode of diode 40 is coupled to conductor 24 as shown.

Element 32 may be any electrical storage element. Preferably element 32 should be dynamically rechargeable. For example, element 32 may comprise a 4700 microfarad, 25 VDC capacitor, or a rechargeable NiCad battery of similar capacity.

The air bag control circuit 30 operates as follows. When sensor 34 senses a crash, it closes allowing current to flow to trigger 36. The trigger 36 is then activated providing gas to the air bag for inflation. The energy storage device is maintained in a charged condition by current from the vehicle battery flowing through relay coil 20, slip ring 18, conductor 24, diode 40 and resistor 38. If the storage element is a capacitor, it is charged to the voltage of the vehicle. If rechargeable batteries are used as a storage element, then a trickle charging current passes through resistor 38 to maintain said batteries at their nominal voltage level. In either event, the charging current through resistor 38 is blocked momentarily while horn button 16 is operated by diode 40. Thus diode 40 insures that the storage element 32 is not depleted by horn button 16. As a result of the diode, the operation of the horn circuit is completely independent of the operation of the air bag control circuit.

Importantly, if the energy storage element 32 fails for any reason, the air bag control circuit is still maintained operational through the diode, slip ring and horn relay coil.

Another advantage of the air bag control circuit of FIG. 2 is that it requires only a ground connection and a connection to conductor 24 which is already connected to a steering wheel element. Therefore the control circuit is very easy to integrate into an existing vehicle design, or to convert to existing vehicle wiring.

Furthermore, it should be appreciated that typically the horn circuit is always operatively connected to the vehicle battery. Therefore the energy storage element is continuously charged regardless of whether the vehicle engine is running or even, whether an ignition key is in the ignition lock of the motor vehicle.

Figure 3:
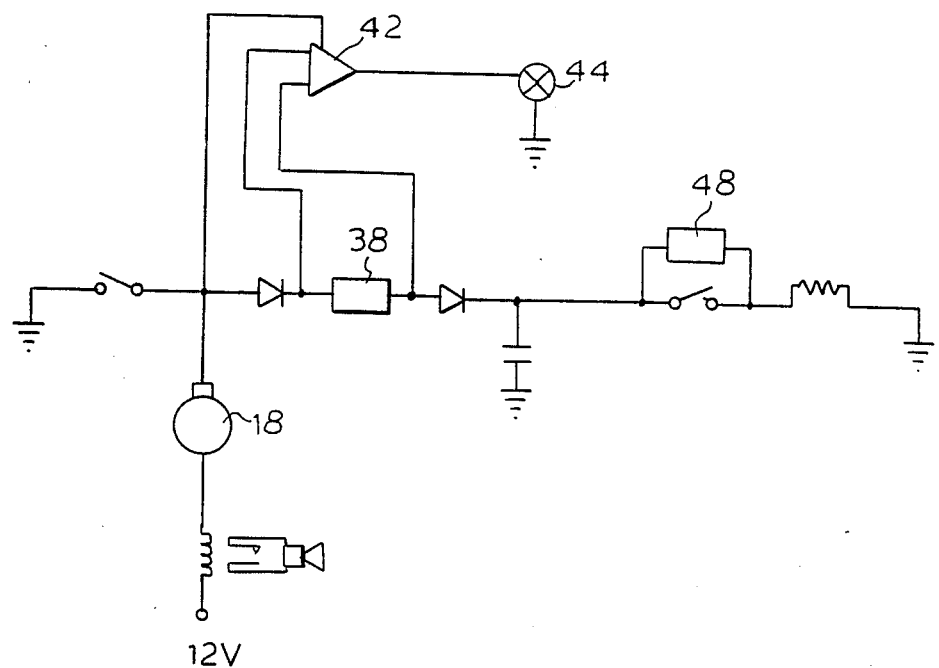
FIG. 3 shows an alternate control circuit of the air bag system of FIG. 1.

In the embodiment of FIG. 3, the same circuit elements are used in the embodiment of FIG. 2, and in addition, a voltage comparator 42 is provided for monitoring the voltage across dropping resistor 38. If the current through resistor 38 is low the comparator 42 has a high output. A high charging current indicating that the energy storage element is in a discharged state turns comparator 42 off. The output of the comparator is used to air bag system indicator 44 (preferably comprising an LED). A second blocking diode 46 is used to isolate the comparator 42 from the storage element 32.

In addition, a diagnostic resistor 48 is provided for continuous monitoring of system readiness.

Alternately, a timer may be substituted for the comparator 42 for indicating that the air bag system is ready for a preselected period after the vehicle ignition is turned on.

Obviously, numerous modifications may be made to the invention without departing from the scope of the invention as defined in the appended claims.

What is claimed is:

1. In a motor vehicle having a battery and a horn circuit formed of a horn activating means in series with a horn switch and said battery for energizing a horn, an air bag control circuit for inflating an airbag comprising:
    an energy storage element in series with said battery and said horn activating means;
    a sensor for generating a signal indicative of a crash said sensor being configured so as to allow a driver independent control of said horn during said signal generation; and
    trigger means energized by said energy storage element in response to said signal.

2. The control circuit of claim 1 wherein said energy storage element is coupled to said horn activating means.

3. The control circuit of claim 2 wherein said energy storage element is coupled to said horn activating means through a blocking diode arranged to permit current flow from said horn circuit to said energy storage element and to inhibit current flow from said energy storage element to said horn circuit.

4. The control circuit of claim 1 wherein said energy storage element comprises a capacitor.

5. The control circuit of claim 1 wherein said energizing storage element comprises a rechargeable battery.

6. In a motor vehicle having a battery and a horn circuit formed of horn activating means in series with a horn switch and said battery having a voltage for energizng a horn, an air bag control circuit for inflating an air bag comprising:
    a diode with an anode terminal and a cathode terminal, said anode terminal attached to said horn circuit such that when said horn switch is open, said anode terminal is biased to substantially the voltage of said battery, such that current may flow from said horn circuit into the anode of said diode, and out of the cathode of said diode;
    an energy storage device with a first and a second terminal, said first terminal configured so as to receive said current from said cathode, said second terminal being substantially attached to ground;
    a crash sensor with a first sensor terminal and a second sensor terminal, said crash sensor having an open electrical connection between said first sensor terminal and said second sensor terminal when no crash is sensed, and a closed electrical connection between said first sensor terminal and said second sensor terminal when a crash is sensed, said first sensor terminal being in substantial electrical connection with said first terminal of said energy storage device;
    air bag activation means with a third terminal and a fourth terminal, said third terminal substantially connected to said second sensor terminal, said fourth terminal substantially connected to ground, said air bag activation means being activated by said crash sensor closing the electrical connection between said first sensor terminal and said second sensor terminal thereby supplying voltage from said energy storage device voltage to said air bag activation means.

7. The control circuit of claim 6 wherein said energy storage device is a capacitor.

8. The control circuit of claim 6 wherein said energy storage device is a battery.

* * * * *